US009004905B2

(12) United States Patent
Humele et al.

(10) Patent No.: US 9,004,905 B2
(45) Date of Patent: Apr. 14, 2015

(54) BLOW MOULDING MACHINE IN A MODULAR DESIGN

(75) Inventors: Heinz Humele, Thalmassing (DE); Klaus Voth, Obertraubling (DE); Johann Zimmerer, Bernhardswald (DE); Dieter Finger, Neutraubling (DE); Martin Seger, Neumarkt in der Oberpfalz (DE); Christoph Klenk, Wenzenbach (DE); Konrad Senn, Regensburg (DE); Frank Winzinger, Regensburg (DE); Alexandra Donhauser, Regensburg (DE)

(73) Assignee: Krones AG, Neutraubling (DE)

( * ) Notice: Subject to any disclaimer, the term of this patent is extended or adjusted under 35 U.S.C. 154(b) by 462 days.

(21) Appl. No.: 13/282,377

(22) Filed: Oct. 26, 2011

(65) Prior Publication Data
US 2012/0100238 A1   Apr. 26, 2012

(30) Foreign Application Priority Data

Oct. 26, 2010   (DE) .......................... 10 2010 049 385

(51) Int. Cl.
| *B29C 49/28* | (2006.01) |
| *B29C 49/64* | (2006.01) |
| *B29C 49/42* | (2006.01) |
| *B29C 49/78* | (2006.01) |
| B29C 49/24 | (2006.01) |
| B29C 49/36 | (2006.01) |
| B29C 49/02 | (2006.01) |
| B29C 49/46 | (2006.01) |

(52) U.S. Cl.
CPC ............. *B29C 49/6418* (2013.01); *B29C 49/24* (2013.01); *B29C 49/28* (2013.01); *B29C 49/36* (2013.01);

(Continued)

(58) Field of Classification Search
CPC ............ B29C 49/4252; B29C 49/4273; B29C 49/786; B29C 2049/4697; B29C 2949/78663
USPC ................................................... 425/528, 534
See application file for complete search history.

(56) References Cited

U.S. PATENT DOCUMENTS 6,134,866 A * 10/2000 Schoenewolff et al. ......... 53/561
6,620,352 B1 * 9/2003 Davis et al. .................. 264/40.4

(Continued)

FOREIGN PATENT DOCUMENTS

| DE | 10 2006 023 531 A1 | 11/2007 |
| DE | 10 2008 038 143 A1 | 2/2010 |

(Continued)

OTHER PUBLICATIONS

German Search Report for counterpart German Application No. 10 2010 049 385.6 (Aug. 12, 2011).

*Primary Examiner* — Yogendra Gupta
*Assistant Examiner* — Kimberly A Stewart
(74) *Attorney, Agent, or Firm* — Novak Druce Connolly Bove + Quigg LLP (57) ABSTRACT

An apparatus for producing plastic containers includes a heating module that heats plastic preforms and a molding module for molding the preforms into containers. The heating module includes a first transport unit that transports the preforms during the heating and a first interface. The molding module is downstream of the heating module in the transport direction and includes a blow molding unit for applying a flowable medium onto the preforms for expansion thereof, a second transport unit that transports the preforms during the expansion, and a second interface. The first and second interfaces allow a mechanical connection and an electrical connection between the modules such that the molding module may be disposed on the heating module and at least one further module integrated between the heating and molding modules. The further module treats the preforms following the heating and prior to the molding.

17 Claims, 7 Drawing Sheets (52) U.S. Cl.
CPC ............... *B29C 49/42* (2013.01); *B29C 49/421* (2013.01); *B29C 49/4252* (2013.01); *B29C 49/4273* (2013.01); *B29C 49/4284* (2013.01); *B29C 49/6445* (2013.01); *B29C 49/78* (2013.01); *B29C 2049/026* (2013.01); *B29C 2049/4697* (2013.01)

(56) References Cited

U.S. PATENT DOCUMENTS

| | | | |
|---|---|---|---|
| 7,399,435 | B2 | 7/2008 | Dunzinger et al. |
| 2004/0159586 | A1* | 8/2004 | Dunzinger et al. ............. 209/11 |
| 2006/0212161 | A1* | 9/2006 | Bhat et al. ................... 700/197 |
| 2007/0220835 | A1* | 9/2007 | Till ................................ 53/471 |
| 2009/0045350 | A1 | 2/2009 | Humele et al. |
| 2010/0289178 | A1 | 11/2010 | Stoiber et al. |
| 2011/0133370 | A1 | 6/2011 | Engelhard et al. |
| 2011/0272861 | A1 | 11/2011 | Humele |
| 2012/0180439 | A1 | 7/2012 | Klenk |

FOREIGN PATENT DOCUMENTS

| | | |
|---|---|---|
| DE | 10 2008 056 346 A1 | 5/2010 |
| DE | 10 2009 021 792 A1 | 11/2010 |
| DE | 10 2009 041 160 A1 | 3/2011 |
| EP | 1 306 195 A2 | 5/2003 |
| EP | 1 982 920 A1 | 10/2008 |
| WO | 2009/144664 A2 | 12/2009 |

* cited by examiner

BLOW MOULDING MACHINE IN A MODULAR DESIGN

CROSS-REFERENCE TO RELATED APPLICATION

This application claims the benefit of priority of German Patent Application No. 10 2010 049 385.6, filed Oct. 26, 2010, pursuant to 35 U.S.C. 119(a)-(d), the disclosure of which is incorporated herein by reference.

TECHNICAL FIELD

The present disclosure relates to an apparatus for producing liquid containers and, more particularly, a blow moulding machine having a modular design.

BACKGROUND

Apparatuses for producing liquid containers have been known from the prior art for a long time. It is in particular known here that during the manufacturing process, containers such as for example plastic containers are initially produced in a moulding process and are subsequently filled with a beverage. Apart from this basic situation, however, such manufacturing systems for beverage containers are very different. Thus, different beverages, for example mineral water or juices, require quite different degrees of purity and/or sterilisation. Also the type of labelling of containers is very different and may be carried out for example by attaching self-adhesive labels or by attaching labels using glue. Further, also the most varied methods for sterilising the containers themselves are known. For this reason, such apparatus are always to be regarded as special machines which therefore require very high manufacturing expenses.

From the so far unpublished DE 10 2009 041 160.7, an apparatus for producing liquid containers is known. In this document it is proposed to provide a transport unit serving as an interface between the outfeed area of a moulding unit and the infeed area of the filling unit, so that a further unit for treating the plastic containers can be inserted into the apparatus between the moulding unit and the filling unit. The subject matter of DE 10 2009 041 160.7 is herewith included in the subject matter of the present application in its entirety by reference.

Further, apparatus are known from the prior art which are used for sterilising the plastic preforms. Thus, for example, an apparatus is known from DE 10 2008 038 143, which includes a sterilisation unit that applies a flowable medium onto a wall of the plastic preforms, and this sterilisation unit is provided on the transport path between a heating unit and the moulding unit for the plastic preforms. The subject matter of DE 10 2008 038 143 is herewith also included in the subject matter of the present application in its entire scope by disclosure.

Further, apparatus are known from the prior art, which allow a targeted temperature control of predetermined areas of the plastic preforms. DE 10 2009 021 792.4 is herewith also included in the subject matter of the present application in its entirety by reference and describes an apparatus for tempering plastic preforms, which includes contacting elements that contact an outside wall of the plastic preforms, in order to achieve in this way a targeted temperature profile on this outside wall of the plastic preforms.

It may therefore be desirable to provide an apparatus that can be adapted, with comparatively low effort, to the most varied circumstances, such as for example the most varied spatial circumstances, but also to different concepts.

SUMMARY

According to various aspects of the disclosure, an apparatus for producing plastic containers includes a heating module that heats the plastic preforms, said heating module having a transport unit that transports the plastic preforms during the heating process. Further, the apparatus includes a moulding module for moulding the plastic preforms into plastic containers, which moulding module is disposed downstream of the heating unit in a transport direction of the plastic preforms. This moulding unit has here, for example, a blow moulding unit for applying a flowable medium onto the plastic preform for the expansion thereof, as well as a transport unit that transports the plastic preforms during the expansion process.

According to the disclosure, the heating module includes a first interface and the moulding module includes a second interface, said first interface and said second interface enabling both a mechanical connection and an electric connection between the modules connected by this interface in such a way that it is possible both to dispose the moulding module on the heating module and to integrate at least one further module between the heating module and the moulding module, which further module treats the plastic preforms following the heating process carried out by the heating module and prior to the moulding process carried out by the moulding module.

According to the disclosure it is proposed here that an apparatus is provided which has specifically adapted interfaces that allow a problem-free integration of further modules. For example, these interfaces allow a so-called "plug and play" integration of further modules, so that both an electric connection and a control related connection as well as a mechanical connection that allows the plastic preforms to be transported from the heating module to the moulding module can be established in as simple a manner as possible.

It is therefore possible to operate selectively with or without one or more further modules.

In some aspects, the moulding module is a stretch blow moulding machine that in addition also has a stretching rod that stretches each of the plastic preforms in the longitudinal direction thereof during the moulding process.

In an exemplary embodiment, the transport unit of the moulding module is formed as a so-called blowing wheel, on which a plurality of blow moulding stations is arranged, within which the plastic preforms are moulded into the plastic containers.

The heating module is in some aspects a microwave oven, however, it would also be possible to provide other heating units such as infrared heating units, STIR heating units and the like.

Here, in some aspects, the plastic preforms are transferred to the moulding module one after the other.

The moulding module may additionally include an infeed wheel for feeding the plastic preforms to the blowing wheel and/or an outfeed wheel for feeding the finished plastic containers out.

In an exemplary embodiment, a transport unit is disposed between the heating module and the moulding module and this transport unit is formed as an interface or has at least one of the interfaces mentioned above. This transport unit is formed here in such a way that the further module can be integrated between the heating module and the moulding module, and a transport stream of the transport containers extends between the moulding unit and the heating module via the further unit.

In an exemplary embodiment, the interfaces respectively include bus systems for exchanging electric signals between the modules connected by these interfaces. It is possible here for the interfaces to be formed as standardised electric interfaces between the modules and for example a basic machine. Here, in some aspects, also the voltage supply of at least one module is effected via a bus system. It has so far been customary practice in the prior art that the individual modules each have their own voltage supply or that a voltage supply or an electric link was looped through the individual system components for example via a cable duct.

In an exemplary embodiment, each module includes a control unit, which control unit is in some aspects formed as a programmable logic controller (PLC). It is possible here for each PLC to include also its own CPU (Central Processor Unit). In this case, the "intelligence" is implemented in the respective module. It would further be possible for the individual PLCs in the modules to be provided just with a connection or interconnection and the "intelligence" to be integrated in the basic machine. In this case, respectively one "controlled hardware" will be present in the individual modules.

In some aspects, all the components for controlling the respective modules are accommodated in the respective module. These may, for example, be controls for treatment units and/or servomotors and/or controls for gripping elements used for gripping the plastic preforms.

In an exemplary embodiment, the interfaces include alignment units in order to align the modules connected to these interfaces in relation to each other. These alignment units can be formed in the type of a pin and a receptacle for these pins, which allow an accurate geometric arrangement of the modules connected by means of these interfaces.

The alignment units are, in some aspects, components of the interfaces, however, the interfaces can also be formed in multiple parts. Thus, the entire system such as for example a blow moulding machine can be implemented with an electric and/or a mechanical interface.

In some aspects, each further module includes at least one interface, in order to enable both a mechanical connection and an electric connection to a further module. Here, in some aspects, the individual interfaces are formed in the same way.

In some aspects, the above-mentioned transport units each include a drive unit as well as a control unit, which can also be connected to the respective modules by means of control units, in order to integrate the transport unit into the entire system also from an electric or a signalling point of view.

Further, the transport unit can include a plurality of gripping elements for gripping the containers, which gripping elements are arranged on a carrier that is rotatable about a predefined rotary axis, said gripping elements being at least partially controllable.

In an exemplary embodiment, the further module is selected from a group of modules consisting of sterilisation modules, inspection modules, transport modules, temperature control modules for applying a temperature profile to the plastic preform, which profile changes in the longitudinal direction and/or the circumferential direction thereof, orientation modules for orientating the plastic preform, cooling modules, labelling modules for the plastic preforms, coating modules, cleaning modules, buffer modules, combinations thereof and the like.

In some aspects, therefore, a temperature control module or a sterilisation module is disposed between the heating module and the moulding module. In addition, it would also be possible for a sterilisation unit for sterilising the plastic preforms to be installed as early as upstream of the heating module in the transport direction of the plastic preforms and for said temperature control module to be installed between the heating module and the moulding module. Thus, the modules located upstream of the moulding module can be arranged in any desired order one after the other.

In an exemplary embodiment, at least one module is provided which effects in one process both an at least partial sterilisation of the plastic preforms and an application of a temperature profile on the plastic preforms, which temperature profile changes in the longitudinal direction and/or the circumferential direction thereof. In this embodiment, the application of the temperature profile on the plastic preform, which changes in the longitudinal direction and/or the circumferential direction thereof, which will be referred to below as preferential heating, and the sterilisation unit are accommodated in one module.

In an exemplary embodiment, both the sterilisation and the temperature profiling of the plastic preforms can be carried out on a treatment star wheel or the treatment carrier. This means that the plastic preforms are transported by the same transport unit during the sterilisation thereof and during the temperature profiling.

In some aspects, the individual machines are designed for a continuous process, which means the transport units transport the plastic preforms not in a cyclic but in a continuous manner. Here, in some aspects, the plastic preforms are passed on from one module to another always in the same position, and in some aspects a pitch between the plastic preforms or bottles in the respective transfer star wheels always remains the same. Thus it is possible for a pitch to be maintained at least in the area between the heating module and the moulding module.

It would also be possible for the individual carriers or gripping elements of the transport unit to be driven by means of electrical drives. In this way, the pitch can be adjusted via the control unit upstream and/or downstream of each module in the transport direction. Such a transport star wheel that would be suitable for this purpose is described for example in document DE 10 2006 023 531A1 or alternatively in WO 2009 144 664 A1. However, it would also be conceivable to effect a change of pitch within a module that treats the preforms or the containers.

Further, in some aspects, all the electric components for controlling a module are accommodated in the respective module itself. In this way, individual modules can, in accordance with a particular plan, be simply exchanged or replaced or, if required, several modules can be arranged between the heating module and the moulding module.

In an exemplary embodiment, the apparatus includes a detection unit that detects a module located on at least one interface. It is possible here that, for example, a sterilisation unit is detected via the interfaces or by a corresponding sensor assembly and is then automatically integrated into the container treatment process. More specifically, the corresponding modules can be detected, for example automatically, and can be integrated in the entire machine control.

In an exemplary embodiment, the apparatus includes a display unit for outputting information that is characteristic for the heating module, the moulding module and/or any further modules that may be present between the heating module and the moulding module. In this way, a uniform visualisation for all the modules is provided. It is in particular possible here for each module in said visualisation image to be programmed as an individual block and for the blocks to be copied together in a simple manner and to be further developed on an individual basis.

In an exemplary embodiment, a clean room having an inlet sluice is arranged around the moulding module and/or the sterilisation module. A further module, which is disposed directly on the moulding module or the sterilisation module, also has a clean room that is designed to be adaptable to the clean room of the moulding module in such a way that a clean room interface is designed to be substantially similar.

In particular, the control unit is also suitable for controlling different air pressures in different modules.

This means that when connecting the respective modules to each other, also clean room boundaries can be set or changed. Thus, for example, if a sterilisation module is added, a clean room surrounding the moulding module could also enclose this sterilisation module. In some aspects, therefore, a clean room that extends about a further module or at least about a transport path along which the containers are transported by this further module, can be coupled to a clean room of the moulding module. In some aspects, therefore, also a coupling unit is provided which allows a substantially gas-tight coupling of a clean room of a further module to a clean room of the moulding module. In some aspects, therefore, at least one further module includes a clean room section.

Further advantages and embodiments will become clear from the attached drawings.

DETAILED DESCRIPTION

Figure 1:
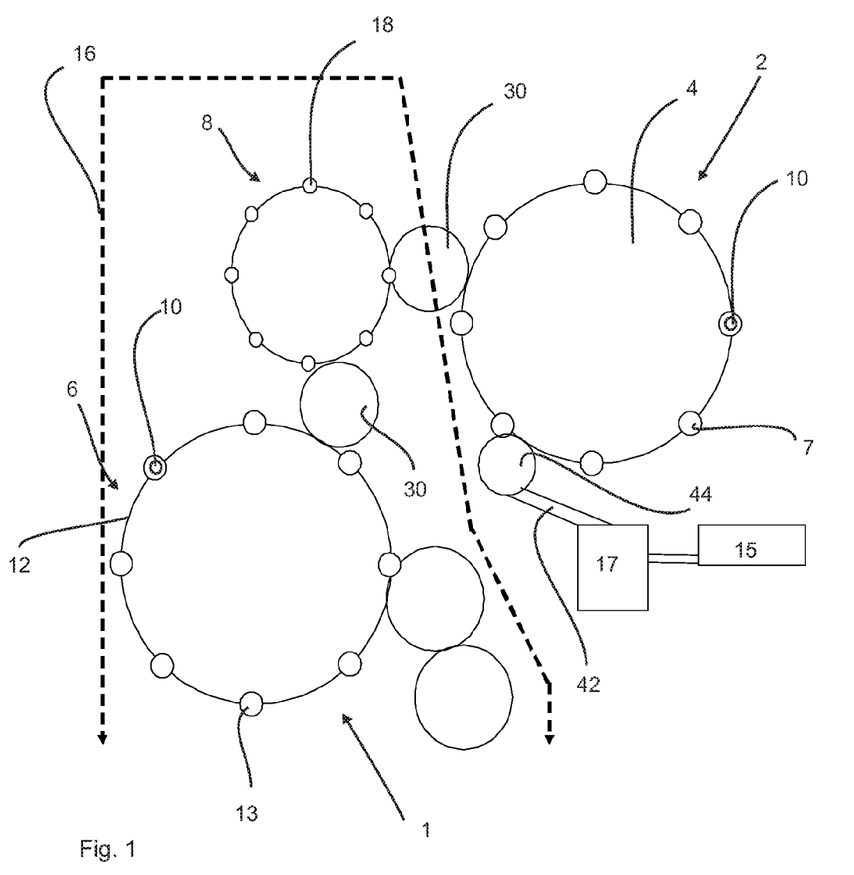
FIG. 1 shows a schematic view of an exemplary apparatus according to the disclosure for treating containers.

FIG. 1 shows an apparatus 1 for treating containers. Here, plastic preforms are fed via a feeding rail 42 to a synchronisation wheel 44 and a heating module 2. This heating module includes a plurality of heating stations 7, within which the plastic preforms 10 are heated whilst being transported by the transport unit 4, which is here formed as a heating wheel. This heating module 2 is here implemented as a microwave heating unit, which means microwaves are applied to the plastic preforms 10 for heating the latter.

It would further be possible for the heating module to be used for sterilising the plastic preforms during the transport of the plastic preforms. The sterilisation, for example, using hydrogen peroxide, could then for example be carried out, as disclosed in document DE 10 2008 056 346 A1, via a channel within a holding mandrel (not shown) that transports the preform 10. In addition, it would also be possible for a so-called preferential heating to be carried out in this area, which means a tempering that varies in the circumferential and/or the longitudinal direction of the plastic preform, which tempering may mean both cooling of certain areas of the wall of the plastic preform and heating of these areas.

Reference numeral 30 identifies a transport unit that passes the plastic preforms onto a further module 8 for treatment. This further treatment module 8 has a plurality of treatment stations 18 which treat the plastic preforms. In the embodiment shown in FIG. 1, the plastic preforms are both sterilised and conditioned by way of the above-described preferential heating or preferential cooling by the module 8. The further module 8 is here also of the rotary type.

The plastic preforms are passed onto the moulding module 6 via a further transport unit 30 such as in particular a transport star wheel. This moulding module 6 has here a plurality of blow moulding stations 13 which are arranged on a transport unit such as for example a blowing wheel 12. During transport by the transport unit 12, the plastic preforms 10 are expanded into plastic containers. Thus, the moulding module 6 is here a blow moulding unit and in particular a stretch blow moulding machine.

Reference numeral 16 identifies a clean room or a sterile room or the boundary thereof. This means that the heated plastic preforms are introduced into the sterile room 16 via a sluice (not shown). The heating module 2 is here connected to the further module 8 by interfaces which are not shown in FIG. 1. However, it would also be conceivable here, if desired, for a transport unit 30 and module 8 to be removed, so that in this way the moulding module 6 and the heating module 2 can be directly connected to each other. It would further be conceivable to integrate several modules 8 between the heating module 2 and the moulding module 6.

In particular, in the case of the further modules besides the heating and moulding modules, the clean room can be designed in such a way that it can also be integrated into existing heating and moulding module arrangements. In other words, the connection point between the clean room, which means the terminal edge of the clean room wall, of at least the moulding module have substantially the same dimensions as for example the terminal edge of the clean room wall of the sterilisation module. One could also say that the clean room wall between two modules has an intended separation point for removing or adding further modules with further clean rooms. In particular, the separation points are provided with seals and/or quick-release connections.

Figure 2A:
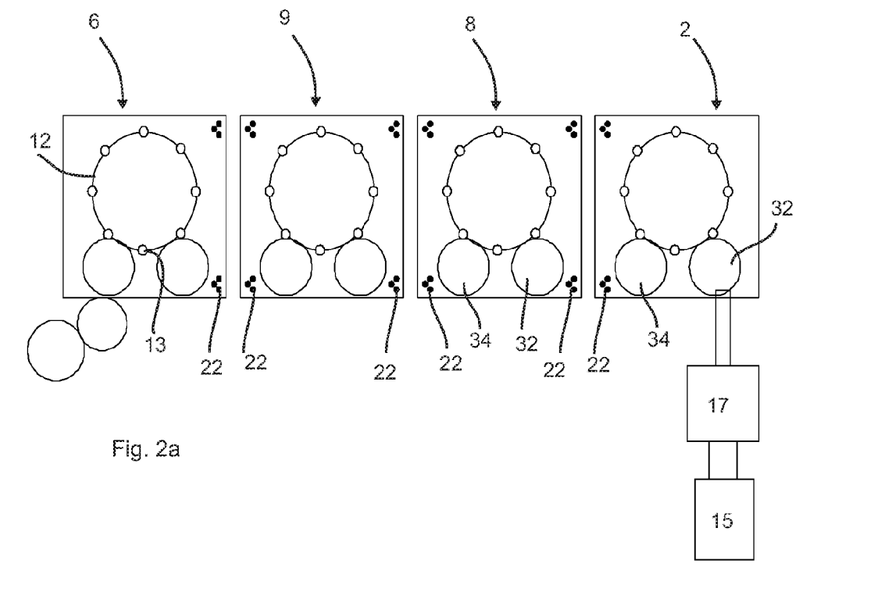
FIGS. 2a, 2b show two views of an exemplary apparatus according to the disclosure having additional modules.

FIG. 2a shows a further embodiment of an apparatus 1 according to the disclosure. Here, a preferential heating module 8 as well as a sterilisation module 9 are disposed between the heating module 2 and the moulding module 6. Reference numeral 22 respectively relates to interfaces which allow a mutual connection of the individual modules 2, 8, 9, 6 to each other. These interfaces 22 are here formed to be essentially of the same type, however, it would also be possible for respectively two interfaces 22 of two modules, as shown in FIG. 2a, to cooperate in the manner of a plug-in coupling system.

These interfaces 22 constitute here in particular not just a mechanical connection between the individual modules or allow the transport of the preforms from one module to the next, but they also establish an electric or signal connection. This means that the individual modules are here, for example, implemented as plug and play modules, which means that once the interfaces are connected, both a mechanical and an electric connection has been established. In the simplest case, the mechanical connection is a drill pattern.

However, it would also be possible for the interfaces shown to be designed in several parts. Also in the case of the apparatus shown in FIG. 2a, a clean room may be provided, within which the plastic preforms are treated. This clean room can here surround all the modules, however, it can also terminate, as shown in FIG. 1, between module 8 and heating module 2. As shown in FIG. 2a, it is principally possible to combine any desired modules with each other in particular also in any desired order. For example, it would be possible to change the order of module 8 and module 9 in relation to each other or, for example, to implement module 9 as a sterilisation module for containers and to dispose it downstream of module 6. Also, the sterilisation module could be positioned upstream of the heating module 2.

However, the clean room could also be formed in a channel-like manner at least in sections about the transport path of the plastic preforms.

Figure 2B:
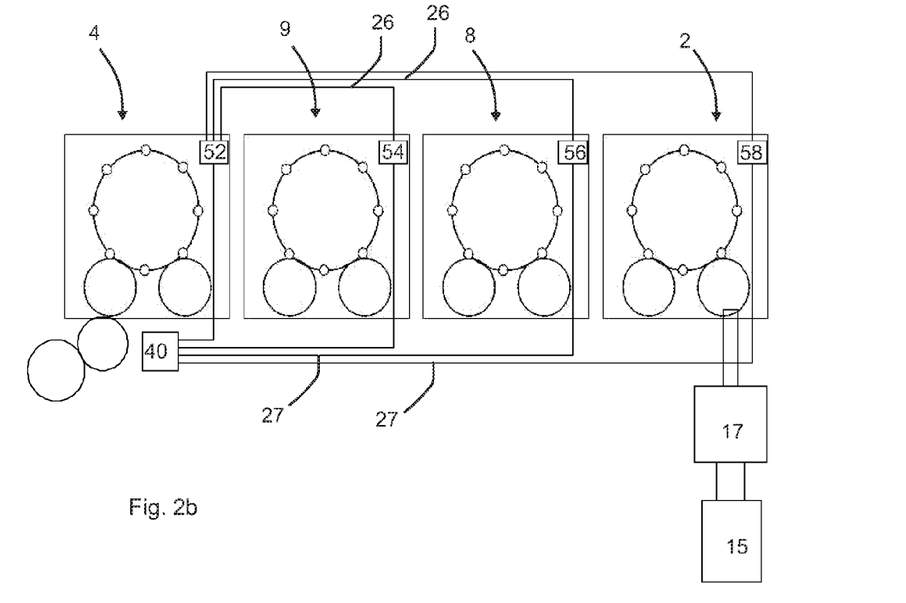

FIG. 2b shows the signalling connection of the respective modules. Here, the moulding module 6 includes a control unit 52, which is also used as a central control for the control units 54, 56 and 58 of modules 9, 8 and 2. Signal exchange is carried out here using bus systems which are not shown in more detail, which means that the individual control units can be connected to each other via these bus systems. In the simplest case, the interfaces establishing the mechanical connections can also be drilling patterns which are engaged by corresponding projections or pins of the respectively other module.

Reference numeral 40 identifies a display unit that can be used to visualise the individual modules to a user. Here, the apparatus may be designed in such a way that when a module 8 or 9 is added and is respectively connected to the connection lines 26, 27, the module concerned can also be automatically visualised on the display device 40. Thus, the system software may be programmed such that in the case of an upgrade, certain functions are enabled or added into the program.

As was mentioned above, the sterilisation module 9 may be a sterilisation module that applies hydrogen peroxide $H_2O_2$ or, for example, also electron beams onto the containers. In addition, the sterilisation module may also be formed as a UV sterilisation module or a plasma sterilisation module, which is disposed in areas of the transport path or also beyond the entire transport path of the containers or the plastic preforms.

In addition, the further modules may also be measuring units such as, for example, a wall thickness measuring unit or a weight measuring unit. It would also be possible for a central control unit or a control unit 52 to carry out the control of all the functions such as, for example, sterilisation, preferential heating and the like. Also, an additional laser heating module may be provided.

Moreover, these modules may be cleaning modules for heating mandrels, blow moulds or clamps, or sorting modules for the plastic preforms. Further, the system may include a so-called CIP module (cleaning-in-place), which is used in particular for cleaning heating mandrels, blow moulds, clamps, plastic preforms sorting units, stretch rods, valve blocks or the like.

In addition it would be possible for a buffer system to be provided between individual modules, such as for example an air transport unit or the like. Further, the apparatus may also include a production unit 15 for the plastic preforms, such as an injection moulding machine or an extruder. Moreover, the moulding module 6 may be followed by further treatment units such as labelling machines, sterilisers, rinsers, filling units or capping units. Reference numeral 17 identifies a cooling unit for the finished plastic preforms.

It would further be possible for the apparatus to include a changing unit, such as for example a machine for changing blow moulds, for changing heating mandrels or for changing stretching rods. Moreover, also an automatic blow nozzle changing unit may be provided, and such systems may also be distributed here over the circumference of the blowing wheel 12 in a modular manner.

Moreover, it would also be possible for an apparatus for labelling the plastic preforms to be provided, and such an apparatus may be disposed for example in the heating module 2. Further, also an additional heating unit for the plastic preforms or a recycling module may be provided. Moreover, depending on the requirements, also a turning module for turning the plastic preforms or an inspection unit may be provided, which controls the heating of the plastic preforms, for example by recording a thermographic image of the plastic preforms.

The moulding module 12 is here implemented as a carousel, however, the individual blow moulding stations 13 that can transport the plastic containers in a continuous or cyclic manner could also be arranged to be stationary. In addition, it would also be possible for the individual treatment stations to have the same pitch, but for one module to run at a higher circulating speed, for example at twice the circulating speed, so that only every other treatment unit is occupied. In this connection, reference is made to International Patent Application PCT/EP2010/053023, the disclosure of which is herewith included in the subject matter of the present application in its entirety by reference.

For the sake of simplicity, the transport star wheels 32 and 34 are only outlined in FIGS. 2a and 2b. In order to ensure a continuous circulation, a module may also include only one transport star wheel 32 for feeding the containers 10 into the module, whilst the outlet is ensured by a further transport star wheel 32 of the next module in the transport direction, which at the same time constitutes the inlet star wheel 32 for the next module. Also, a module may only have one transport star wheel 34 for the outlet of the containers 10 from the module, whilst the inlet is ensured by a further transport star wheel 34 of the preceding module in the transport direction, which at the same time constitutes the outlet star wheel 34 for the preceding module.

Figure 3A:
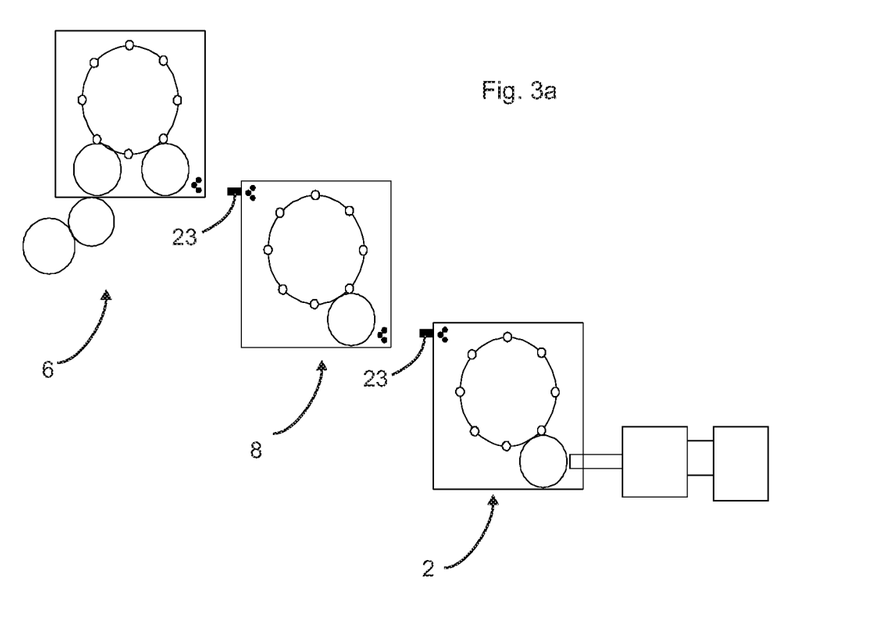
FIGS. 3a, 3b show two views of an exemplary apparatus having an interposed module.
Figure 3B:
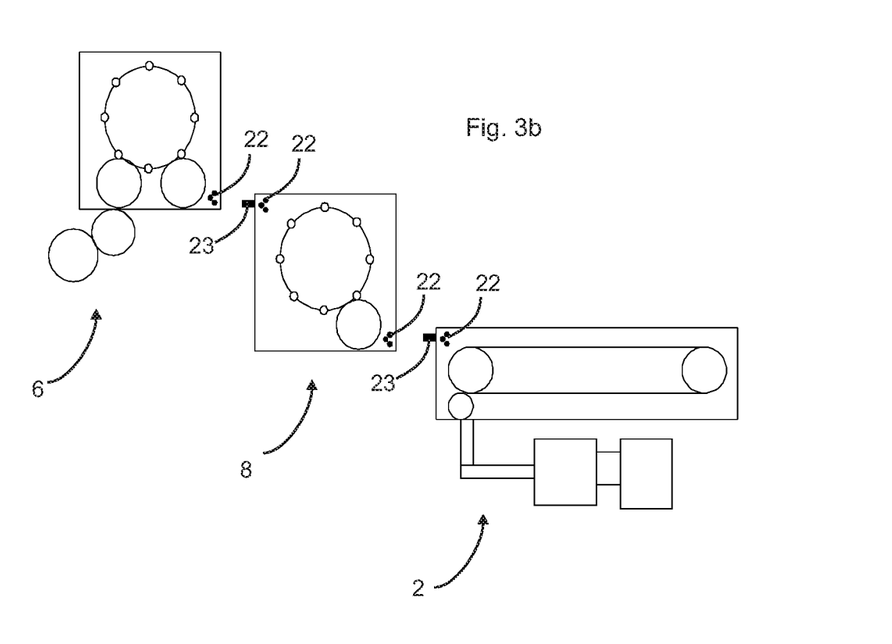

FIGS. 3a and 3b show two further embodiments of an apparatus according to the disclosure. Here a further module 8, more specifically a sterilisation module or a preferential heating module, is interposed between the heating module 2 and the moulding module 6. Whilst the heating module 2 is implemented as a microwave oven in the embodiment shown in FIG. 3a, the heating module 2 shown in FIG. 3b is an infrared oven that heats the plastic preforms.

Reference numeral 23 identifies an alignment unit that effects an alignment of these modules relative to each other, when these modules are connected to each other. In this context, the alignment unit 23 may for example be a pin that engages in a corresponding recess (not shown) of the respectively other module. In this way, the modules thus connected can be mounted in an accurate geometrical arrangement relative to each other.

FIGS. 4a-4d show four views for illustrating a combined sterilisation as well as conditioning of the plastic preforms. Here, in the variant shown in FIG. 4a, a rod-shaped conditioning body 62 is provided which can be inserted into the plastic preform 10. Reference numeral 64 identifies a holding mandrel which also engages in the plastic preform and holds the latter by its mouth from the inside.

Figure 4A:
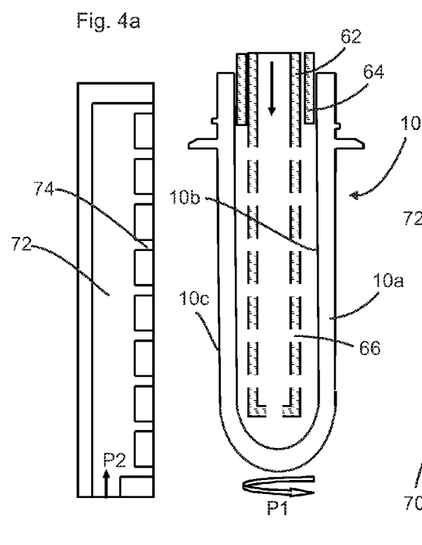
FIGS. 4a-4d show four views for illustrating an exemplary combined sterilisation and conditioning module.

This holding mandrel may also be implemented to be rotatable, so that a rotation of the plastic preform, as illustrated by arrow P1, can be carried out. The conditioning body 62 has here a plurality of openings 66, through which a sterilisation medium can be applied onto the inside wall 10b of the plastic preform. The sterilisation medium, which may for example be gaseous H₂O₂ or peracetic acid, is applied here onto targeted areas of the plastic preform via the individual openings 66, so that those areas of the plastic preforms are sprayed in a targeted manner, which are to be tempered differently. It would also be possible to apply the sterilisation medium initially to all of the areas of the inside wall and subsequently a second time onto certain areas, so that these areas are tempered in a corresponding manner.

Thus, the conditioning body 62 is implemented here in such a way that all the areas of the plastic preforms, which are to be tempered differently, are sprayed in a targeted manner. In this way, it would be possible to achieve a profile in an axial direction, i.e. along the longitudinal direction L of the plastic preform, and control could also be effected via the size of the individual bores 66.

Reference numeral 70 identifies a further application unit for application onto an outside wall 10c of the plastic preforms. This has here also a plurality of openings 74 which are supplied from a common channel 72 and which also apply, if needed, a sterilisation medium onto the outside wall of the plastic preform. This application in turn can be used to achieve a different tempering of different circumferential areas of the plastic preform. This different tempering can be used in the subsequent blow moulding process to generate rotationally non-symmetric containers, for example oval containers. The intensely heated areas will then stretch to a correspondingly higher degree.

The conditioning body 62 is here, in some aspects, formed to be rod-shaped, so that the thermal profile can be applied over the entire height of the plastic preform.

It would further be possible to realise in the manner shown an improved neck handling for the neck of the plastic preform. The sterilisation medium, for example H₂O₂, may also be in the liquid phase and cools the areas of the plastic preform, which will later have to travel over a longer stretching section, and at the same time the thread and the support ring will be cooled in a targeted manner. As shown, the sterilisation nozzles may be on the outside or on the inside. In this way it is possible to heat the support ring area slightly more and to improve the stretching of the material just below.

The sterilisation of the plastic preforms as shown here could still also be carried out in a microwave oven or in a conventional linear infrared oven. A controller may be provided here, by means of which the individual circumferential areas are sensed using a temperature sensor, and in response to that the spray pressure may be adjusted. Reference numeral 10a identifies a base body of the plastic preform.

Figure 4B:
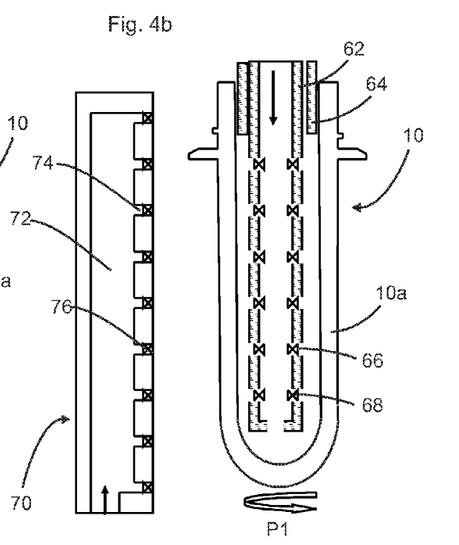

In the illustration shown in FIG. 4b, valves 68, 76 are additionally provided, by means of which the exit of the sterilisation medium via the individual openings 66 can be separately controlled. The holding mandrel 64 is here, for example, rotatable in a stepwise manner. In the case of small preforms 10 it may be possible, depending on the circumstances, to arrange valves 66, 68 only on one side, and therefore rotation becomes all the more important.

Figure 4C:
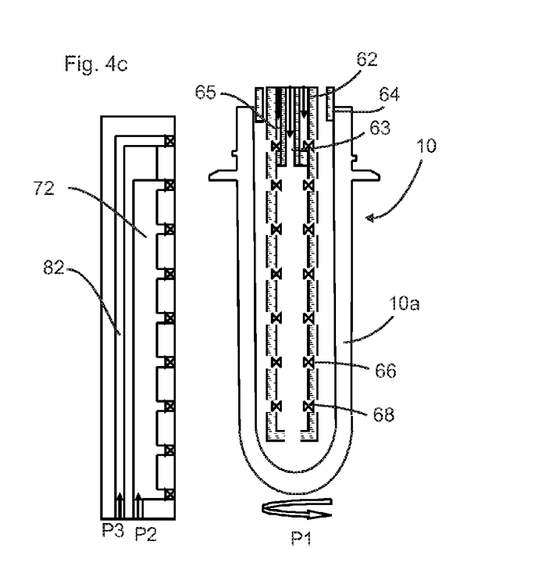

In the embodiment shown in FIG. 4c, two supply paths 72 and 82 for the sterilisation medium are provided. Here, cold sterilisation medium can be supplied in an upper area along the supply path 82 and warmer sterilisation medium can be supplied via the feeding area 72. In this way, the mouth of the container can be cooled or can be sterilised not so hot that it heats up even further.

Two separate supply paths 63, 65 leading into the conditioning body 62 are also provided here, with the supply path 63 being for the lower openings and the supply path 65 for the upper openings.

Figure 4D:
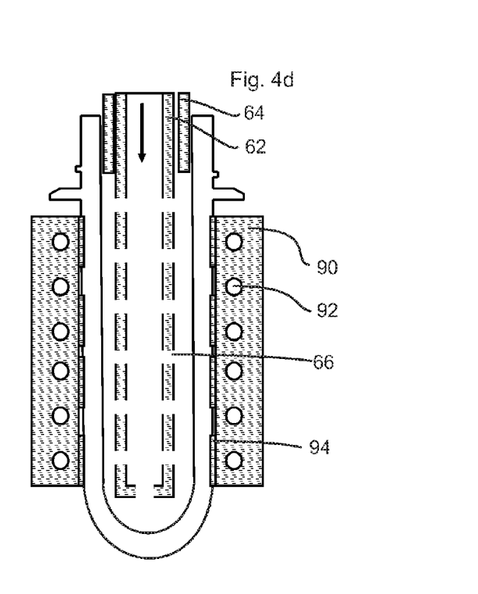

FIG. 4d shows a further embodiment wherein a conditioning mandrel 62 having at least one opening 66 is provided here as well as a holding mandrel 64 that can optionally also rotate the plastic preform. Further, an application unit 90 (in particular one that is implemented as a clamp) is provided here, which can contact an outside wall of the plastic preform in sections, in order to temper and in particular cool these areas. In this connection, electric heating units or tempering medium channels 92 may be provided here, in order to temper the application unit 90 or the individual contacting surfaces 94. It can be seen here that the plastic preform is tempered in the longitudinal direction L thereof differently in some areas than in other areas. It is possible also in this way to stretch the plastic preform in the subsequent process more intensely in some places than in other places. In other words, the apparatus according to FIG. 4d provides for a simultaneous sterilisation and temperature profiling of a preform 10, in particular by means of contacting elements 90, 94. In particular, the sterilisation can be carried out using a mandrel from the inside and the profiling on the outside of the preform 10.

It would also be conceivable to provide two sterilisation modules, one of which has mandrels 64 for engaging the preforms on the inside in order to transport the preforms 10, and the other one has gripping clamps to be used as an outside gripper, so that the entire surface of the preform 10 can be sterilised.

Figure 5A:
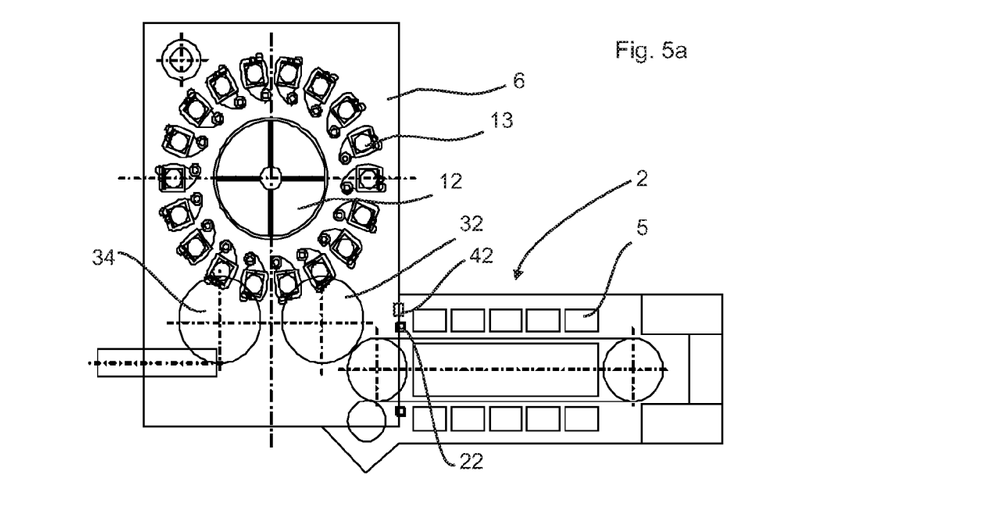
FIGS. 5a-5b show two further views for illustrating an exemplary apparatus according to the disclosure.

FIGS. 5a and 5b show two further embodiments of an apparatus according to the disclosure. In the embodiment shown in FIG. 5a, a heating module 2 is directly connected to a moulding module 6. Thus, the entire apparatus 1 consists of two modules which are connected to each other by the interfaces 22, and this connection can be separated. Reference numeral 42 relates to a bus system, by means of which the electric connections can also be established. Thus, the two modules 2, 6 are connected to each other from a control point of view.

Figure 5B:
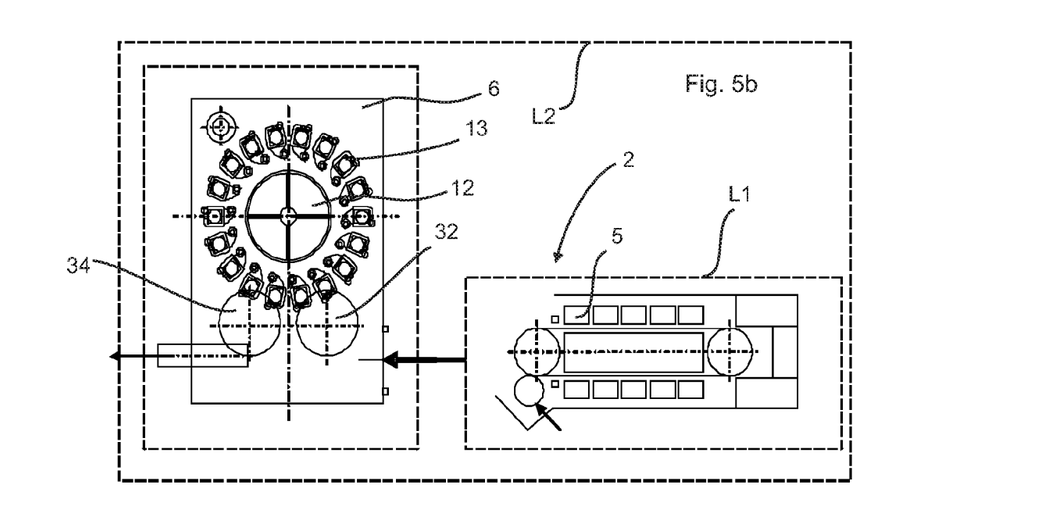

In the illustration shown in FIG. 5b, the individual interfaces 22 are respectively shown and the dotted lines L1 and L2 respectively show the system boundary of the heating module 2 and of the moulding module 6. Reference numeral 32 in FIGS. 5a and 5b identifies an infeed wheel or an inlet star wheel that supplies the plastic preforms to the blowing wheel, and reference numeral 34 identifies an outfeed wheel or an outlet star wheel that discharges the produced containers from the blowing wheel. These inlet and outlet star wheels are here, for example, components of the respective modules. In this connection, these inlet and outlet star wheels 32, 34 can also respectively be driven by their own servomotors, which motors, however, are in some aspects co-controlled by the control units of the modules. Reference numeral 5 relates to a heating element of the heating module 2.

Figure 6A:
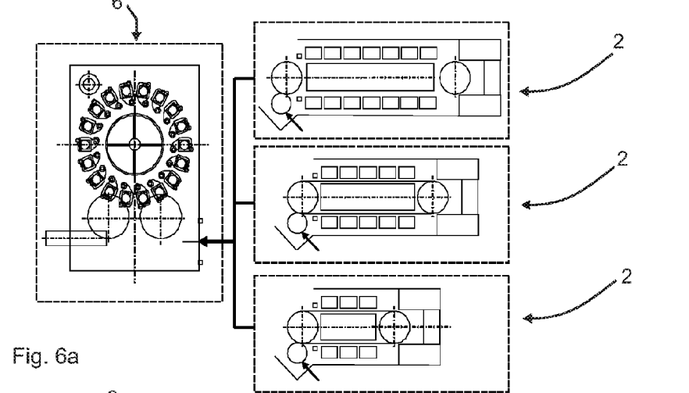
FIGS. 6a-6c show three views for illustrating the exemplary modular concept.
Figure 6B:
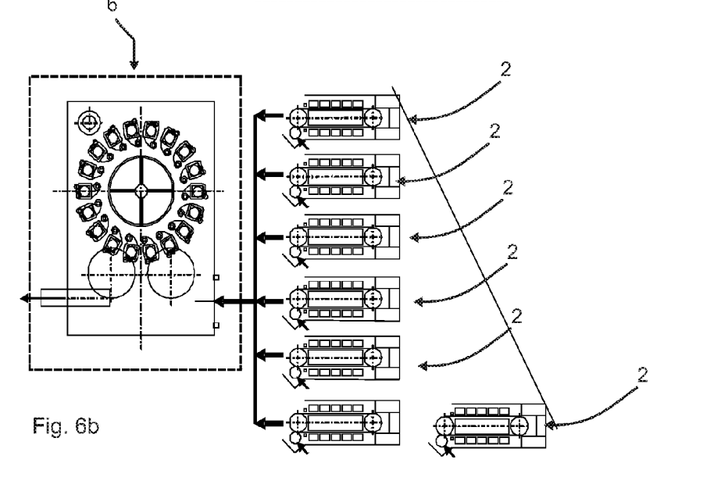

FIG. 6a shows that a certain moulding module 6 can, depending on the customer's requirements, be coupled to different heating modules 2, since the above-mentioned interfaces 22 are respectively standardised. The same approach is illustrated in FIG. 6b for another number of heating modules. Here, the different heating modules 2 may include a different number of heating elements 5. Heating elements 5 are understood to mean in particular infrared heater boxes having a certain number of infrared lamps arranged therein. In the case of a microwave oven, the heating elements may also constitute resonators. Generally speaking, one can also refer to them as heating chambers which are used for individually heating individual preforms 10.

Figure 6C:
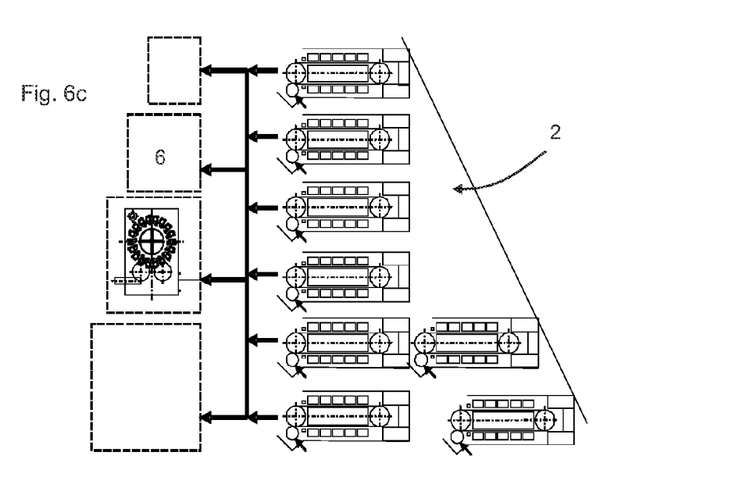

FIG. 6c illustrates that it is principally possible to couple any desired heating modules 2 with any desired moulding modules 6 via the respectively standardised interfaces. Thus, for example, the topmost moulding module shown in FIG. 6c can be coupled with any of the individually shown heating modules 2.

It would also be conceivable to associate two heating modules 2 with one moulding module 6. To this end, also two interfaces may be provided for each moulding module 6. Also, heating modules 2 of the same or of different types may be coupled in series one after the other by means of an interface 22.

Figure 7:
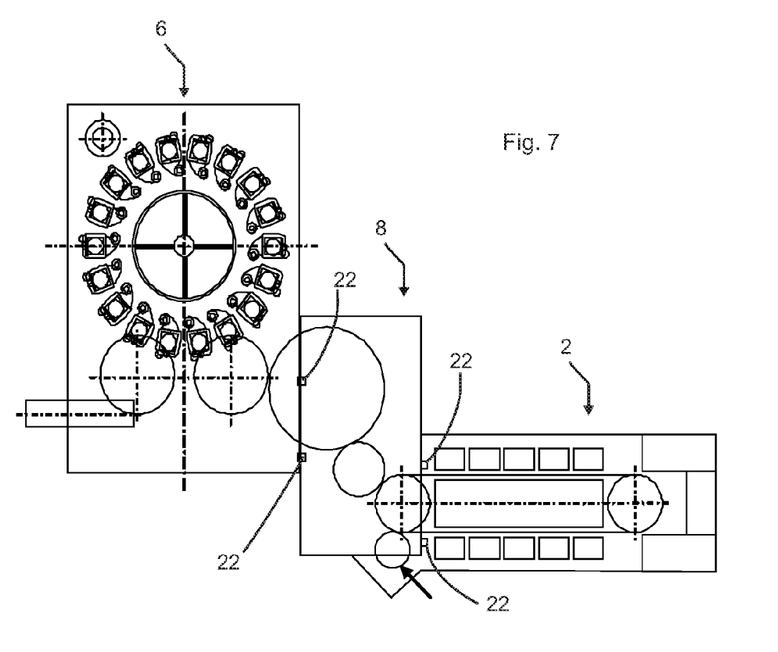
FIG. 7 shows a further view for illustrating an exemplary apparatus having an interposed module.

FIG. 7 shows, similarly to FIGS. 3a and 3b, a stretch blow moulding machine having an intermediate module 8, with the individual modules being here connected to each other via the interfaces 22 shown.

Figure 8:
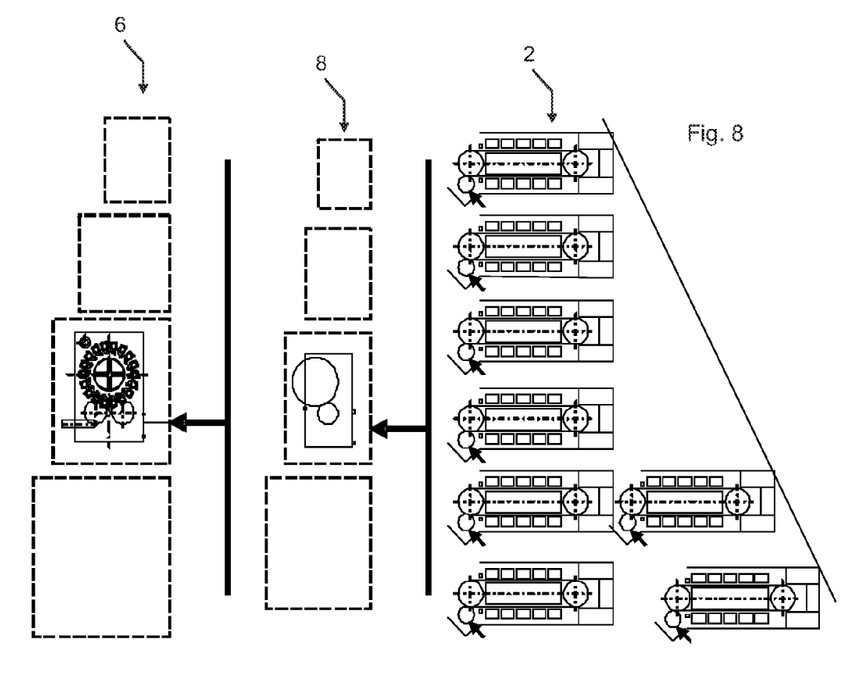
FIG. 8 shows a view for illustrating an exemplary apparatus having a modular design.

As can be seen from FIG. 8, it is further also possible to connect any desired heating modules 2 with any desired intermediate modules 8 to any desired moulding modules 6. For example, here, the moulding module 6 is respectively implemented as a master module having a central control.

It will be apparent to those skilled in the art that various modifications and variations can be made to the blow moulding machine in a modular design of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for producing plastic containers, comprising:
   a heating module that heats plastic preforms, the heating module including a transport unit that transports the plastic preforms during the heating process; and
   a moulding module for moulding the plastic preforms into plastic containers, the moulding module being disposed downstream of the heating unit in the transport direction of the plastic preforms, the moulding module including:
      a blow moulding unit for applying a flowable medium onto the plastic preforms for the expansion thereof, and
      a transport unit that transports the plastic preforms during the expansion thereof,
   wherein the heating module includes a first interface and the moulding module includes a second interface, the first interface and the second interface allowing both a mechanical connection and an electric connection between the modules connected by the interfaces in such a way that it is possible to integrate at least one further module between the heating module and the moulding module, which at least one further module treats the plastic preforms following the heating process carried out by the heating module and prior to the moulding process carried out by the moulding module, and
   wherein said at least one further module is a module that carries out in one process both an at least partial sterilization of the plastic preforms and an application of the temperature profile on the plastic preforms, which temperature profile changes in the longitudinal direction and/or the circumferential direction thereof.

2. An apparatus for producing plastic containers, comprising:
   a heating module that heats plastic preforms, the heating module including a transport unit that transports the plastic preforms during the heating process; and
   a moulding module for moulding the plastic preforms into plastic containers, the moulding module being disposed downstream of the heating unit in the transport direction of the plastic preforms and the moulding module including:
      a blow moulding unit for applying a flowable medium onto the plastic preforms for the expansion thereof, and
      a transport unit that transports the plastic preforms during the expansion thereof,
   wherein the heating module includes a first interface and the moulding module includes a second interface, the first interface and the second interface allowing both a mechanical connection and an electric connection between the modules connected by the interfaces in such a way that it is possible to integrate at least one further module between the heating module and the moulding module, which at least one further module treats the plastic preforms following the heating process carried out by the heating module and prior to the moulding process carried out by the moulding module; and
   a detection unit, which detects the at least one further module disposed on at least one of the first interface and the second interface.

3. The apparatus of claim 1, wherein each of the interfaces are implemented to be of a same type.

4. The apparatus of claim 2, further comprising a display unit for outputting information that is characteristic for the heating module, the moulding module and at least one further module that may be present between the heating module and the moulding module.

5. The apparatus of claim 2, wherein the at least one further module is integrated between one of the heating module or the moulding module.

6. The apparatus of claim 1, wherein the at least one further module is integrated between one of the heating module or the moulding module.

7. The apparatus of claim 1, wherein each of the first and second interfaces respectively includes a bus system for exchanging electrical signals between the heating and moulding modules connected by the first and second interfaces.

8. The apparatus of claim 7, wherein a voltage supply of at least one module of said heating, moulding, and further modules is effected via a bus system.

9. The apparatus of claim 1, wherein each of said heating and moulding modules includes a control unit.

10. The apparatus of claim 9, wherein said control units are implemented as a programmable logic controllers (PLCs).

11. The apparatus of claim 1, wherein each further module includes at least one further interface in order to enable both a mechanical connection and an electrical connection to an additional module.

12. The apparatus of claim 1, wherein the further interfaces have alignment units in order to align the further and additional modules connected by these interfaces in relation to each other.

13. The apparatus of claim 1, wherein the further module is selected from a group of modules including sterilization modules, inspection modules, transport modules, tempering modules for applying a temperature profile to the plastic preforms, which temperature profile changes in the longitudinal direction and/or the circumferential direction thereof, orientation modules for orientating the plastic preform, cooling modules, labelling modules for plastic preforms, coating modules, cleaning modules, buffer modules, and combinations thereof.

14. The apparatus of claim 1, wherein both the sterilization and the temperature profiling can be carried out on a treatment star wheel.

15. The apparatus of claim 1, further comprising a detection unit, which detects the further module disposed on at least one of the first and second interfaces.

16. The apparatus of claim 1, wherein at least one of the moulding module and the further module include a clean room that forms a clean room interface to a further module.

17. The apparatus of claim 16, wherein the further module comprises a sterilization module.

* * * * *